UNITED STATES PATENT OFFICE.

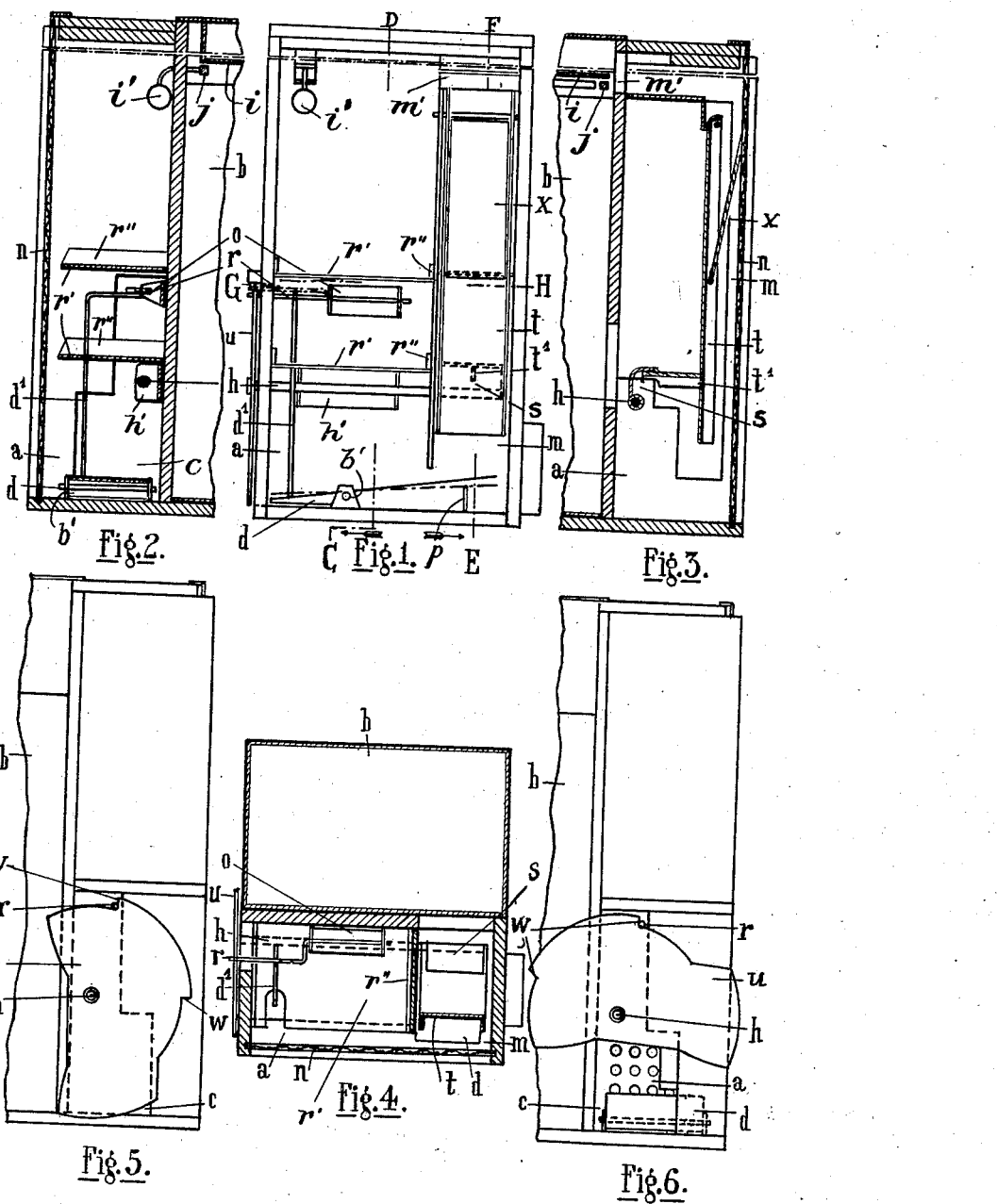

MICHAEL JAEGER, OF DARMSTADT, GERMANY.

ANIMAL-TRAP.

999,651.  Specification of Letters Patent.  Patented Aug. 1, 1911.

Application filed September 16, 1910. Serial No. 582,400.

*To all whom it may concern:*

Be it known that I, MICHAEL JAEGER, a subject of the German Emperor, residing at Darmstadt, Grand Duchy of Hesse, in the Empire of Germany, have invented certain new and useful Improvements in Animal-Traps, of which the following is a specification.

My present invention relates to animal traps and more particularly to a class in which the trap is automatically re-set by the animal caught therein, the trap remaining sprung until the animal has traveled to a receiving chamber and the entrance to which chamber is barred against return of the animal to the setting chamber.

The objects of my invention are to provide a trap of the class described which is simple in construction, positive in action and to accomplish these objects with a minimum number of parts consistent with the durability of the device. I attain these objects by the construction and arrangement of parts shown in the accompanying drawings, in which,—

Figure 1 is a front elevation of a trap embodying my invention, the wire netting front having been removed to more clearly disclose details of construction. Fig. 2 is a partial vertical cross section on the line C—D of Fig. 1. Fig. 3 is a similar view taken on the line F—E of Fig. 1. Fig. 4 is a horizontal cross sectional view taken on the line G—H of Fig. 1. Fig. 5 is a view showing a portion of the trap in side elevation, the entrance of the trap being shown closed. Fig. 6 is a similar view showing the trap entrance open.

Similar characters refer to similar parts throughout the several views.

In the drawings, $a$ represents the catching chamber of the trap, provided with an entrance opening $c$, and $b$, a receiving chamber, communication between the chambers $a$ and $b$ being through an intermediate passage $m$. Within the catching chamber $a$, and extending into the lower part of the passage $m$, is a tilting bridge $d$, pivoted at $b'$, the forward end of which is directly in the path of the animal entering through the opening $c$.

For the purpose of closing the opening $c$ of the catching chamber, a drop member $u$, pivoted by a spindle $h$ extending from the outside of the trap to the passage $m$ and supported by a bracket $h'$, is provided with stops $w$ spaced apart by a curved portion concentric with the pivotal point of the drop member, and is adapted to be held in a closed or open position with respect to the opening $c$, by a locking arm $r$ pivoted at $c°$. In order to free the drop member of the locking arm $r$, for the purpose of springing or setting the trap, a releasing bar $d'$ is carried by the tilting bridge in such manner as to raise the locking arm $r$ when the rear end of the tilting bridge is lowered by the weight of the animal thereon.

That portion of the locking arm $r$ within the trap, is inclosed between two horizontal plates $r'$, the upturned margins $r''$ of which form means for securing the plates in place. By thus inclosing the locking arm, there is no danger of the animal reaching it from the inside of the trap.

In order to limit the downward movement of the rear end of the tilting bridge, a suitable stop $p$ is provided.

Within the intermediate passage $m$, I provide means for resetting the trap through the action of the animal traveling from the catching chamber to the receiving chamber and also means preventing return of the animal again to the catching chamber after once having entered the receiving chamber. The resetting means comprises a setting lever secured to the inner end of the spindle $h$, and a pendent setting flap $t$ having a projection $t'$ engaging the setting lever $s$, whereby rotation of the spindle $h$, to return the drop member $u$ to an open position with respect to the opening $c$, is accomplished upon movement of the flap by the animal.

As a last resort for retaining the animal within the trap, an automatic door $i$ is provided, pivoted at $j$, and by which the animal is confined within the receiving chamber after having passed through the entrance $m'$ communicating with the passage $m$. This door $i$ is returned to its normal position by a counter-weight indicated at $i'$.

The front of the trap is provided with a wall of wire netting to allow of easier access to, and inspection of all of the parts of the trap, and also to allow of its thorough cleaning.

As clearly shown in Fig. 3, return movement of the animal from the receiving chamber is prevented by an auxiliary flap $x$, pivoted to the setting flap $t$ and lying against the wall $n$ of the trap.

The operation of the device is as follows:—Upon entrance of the animal into the catching chamber, and upon its reaching that portion of the tilting bridge above the stop $p$, the releasing bar $d'$ raises the locking arm $r$ out of engagement with one of the stops $w$ of the drop member $u$. Owing to the unsymmetrical placing of the member $u$ with respect to the spindle $h$, the member immediately drops closing the opening $c$. Should the animal return to the forward end of the tilting bridge, the locking arm is then released and drops behind one of the stops $w$ of the member $u$ to prevent its movement. The animal, in its endeavor to get out of the trap, locates the intermediate passage $m$ and in passing therethrough actuates the spindle $h$ through the setting flap $t$ which resets the trap. Once the animal is within the receiving chamber $b$, return to the receiving chamber is prevented by the auxiliary flap $x$.

I claim:

1. An animal trap comprising, a catching chamber having an opening in one side thereof, a receiving chamber, a passage intermediate the said catching and receiving chambers, a spindle rotatably mounted, extending from said intermediate passage and projecting beyond the said side with the opening, a drop member, carried by said spindle, adapted to close or free the said opening, catch mechanism adapted to hold said drop member in a freed position with respect to the said opening, a tilting bridge, pivoted in said catching chamber, extending into said intermediate passage and adapted to be operated by the weight of the animal, means carried by said tilting bridge to operate said catch mechanism, a setting lever secured to said spindle within said intermediate passage, a pendent setting flap adapted to actuate said setting lever, upon movement thereof, to set said drop member to a freeing position with respect to the said opening, and an auxiliary flap pivoted to said pendent setting flap and projecting upwardly between it and one wall of the chamber, combined substantially as and for the purpose set forth.

2. An animal trap comprising, a catching chamber having an opening in one side thereof, a receiving chamber, a passage intermediate the said catching and receiving chambers, a spindle rotatably mounted, extending from said intermediate passage and projecting beyond the said side with the opening, a drop member, carried by said spindle, adapted to close or free the said opening, catch mechanism adapted to hold said drop member in a closed or freed position with respect to the said opening, a tilting bridge, pivoted in said catching chamber, extending into said intermediate passage and adapted to be operated by the weight of the animal, means carried by said tilting bridge to operate said catch mechanism, a setting lever secured to said spindle within said intermediate passage, a pendent setting flap adapted to actuate said setting lever, upon movement thereof, to set said drop member in a freeing position with respect to said opening, and an auxiliary flap pivoted to said pendent setting flap and projecting upwardly between it and the wall of the chamber, combined substantially as and for the purpose set forth.

3. In an animal trap, the combination with a catching chamber, having an opening, and a receiving chamber in communication therewith, of a tilting bridge in said catching chamber adapted to be operated by the weight of the animal, a movable member having suitable stops, adapted to close or free the said opening in the catching chamber, and a pawl operatively connected with said tilting bridge and actuated upon movement thereof to engage the said stops of the movable member to hold the latter in a closed or freed position with respect to the said opening.

4. In an animal trap, the combination with a catching chamber, having an opening, and a receiving chamber in communication therewith, of a pivoted member, having stops spaced apart by a curved portion concentric with the pivotal point, adapted to close or free the said opening in the catching chamber, a pawl adapted to engage the said stops to hold the pivoted member in a closed or freed position with respect to the said opening, and a pivoted member adapted to actuate said pawl upon movement thereof by the animal.

5. An animal trap comprising, a catching chamber having an opening in one side thereof, a receiving chamber, a passage intermediate the said catching and receiving chambers, a spindle rotatably mounted and extending from said intermediate passage and projecting beyond the said side with the opening, a drop member, carried by said spindle, adapted to close or free the said opening, a tilting bridge, pivoted in said catching chamber and adapted to be operated by the weight of the animal, a trip pawl, operatively connected to said tilting bridge, to hold said drop member in an open or closed position with respect to the said opening in said catching chamber, and a setting lever carried by the said spindle portion within said intermediate passage to actuate said drop member to a freed position with respect to the said opening, combined substantially as and for the purpose set forth.

In testimony whereof I affix my signature in presence of two witnesses.

MICHAEL JAEGER.

Witnesses:
JEAN GRUND,
CARL GRUND.